United States Patent Office 3,431,902
Patented Mar. 11, 1969

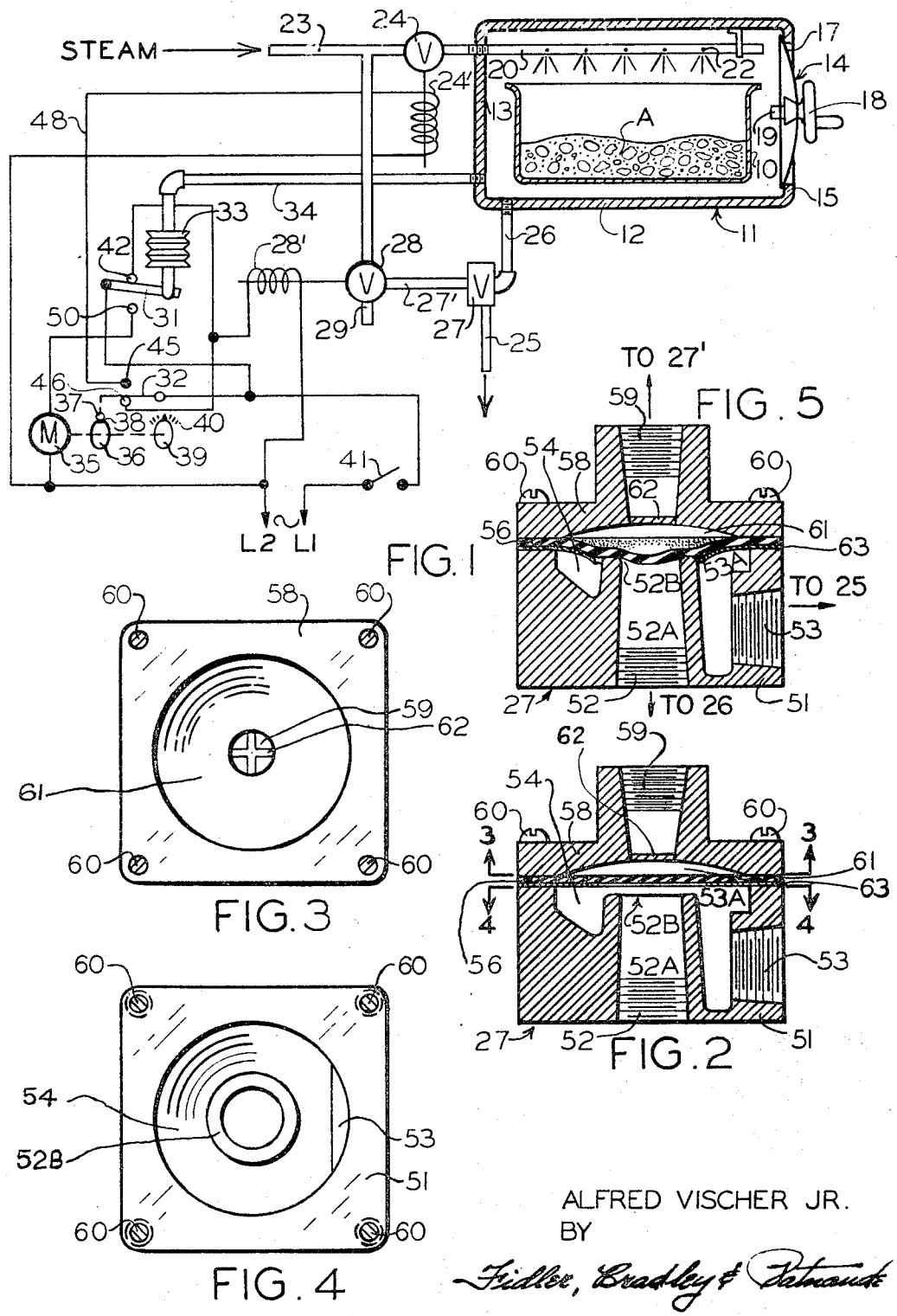

3,431,902
PRESSURE COOKING SYSTEM INCLUDING
PRESSURE OPERATED DRAIN VALVE
Alfred Vischer, Jr., Park Ridge, Ill., assignor of two-thirtieths each to William Vischer, Alfred Vischer III, Peter Vischer, and Gertrude V. Bouton, four-thirtieths each to Walter W. Zitzewitz and Elmer K. Zitzewitz, and one-thirtieth each to Gertrude J. Zitzewitz and Barbara O. Zitzewitz
Filed Jan. 30, 1967, Ser. No. 612,425
U.S. Cl. 126—20          8 Claims
Int. Cl. A21b 1/08; A47j 27/62

ABSTRACT OF THE DISCLOSURE

A pressure cooker includes a drain valve that responds to clean, heated vapor used for the preparation of food. The vapor is applied to one side of a diaphragm to urge the diaphragm into a closed position against an annular valve seat surrounding a relatively small orifice that opens into the bottom of the cooker. A washer-like biasing spring maintains the diaphragm in an open position to prevent it from being drawn into the closed position when a negative pressure exists within the cooker, and also to prevent a portion of the diaphragm from deforming when located in the closed position.

---

This invention relates in general to a pressure cooking system including a pressure operated drain valve for exhausting the heating vapor and liquid from the cooking compartment, and it also relates to a novel diaphragm type valve which may be used for controlling the exhaustion or drainage of fluids from a pressure cooker.

The type of pressure cooker which has been sucessfully employed by restaurants and the like to rapidly prepare large quantities of food necessarily includes a value-controlled drainage system for exahusting fluids from the cooker after a cooking operation. The conventional drain valve for exhausting such fluids is solenoid operated and has been subject to malfunction because solids entrained in the fluid tend to condense on and encrust the moving parts of the drain valve.

In an attempt to overcome this difficulty, motor-operated ball valves have been employed to control the removal of exhaust fluids from the pressure cooker. In such systems, a motor was used to drive the exhaust valve into an open or closed position in order to forcefully overcome the encrusted condition of the valve operating mechanism. Due to encrustation of the valve operating mechanism, this prior art arrangement was not entirely satisfactory because even the motor-operated ball valve would eventually require repair or replacement.

Therefore, an object of this invention is to provide a new and improved pressure cooking system.

Another object of the present invention is to provide a new and improved valve adapted for use in a steam pressure cooker.

Still another object of the present invention is to provide a diaphragm drain valve for pressure cookers wherein the control portions are sealed off from the valve portion and which operates efficiently and does does not tend to become encrusted from the exhaust fluids.

A further object of the present invention is to provide a diaphragm drain valve for steam pressure cookers having the foregoing qualities and which has a simple, economical construction.

Briefly, the above and further objects are realized in accordance with the present invention by the provision of a pressure cooking system which employs the clean, heated vapor, which is used for the preparation of the food, to operate the drain valve. This vapor is applied to a large area surface on one side of a diaphragm type valve element to urge the diaphragm into a closed position against an annular valve seat surrounding a relatively small orifice that opens into the bottom of the cooker. With this construction, only the clean, heated vapor comes into contact with the operating mechanism of the drain valve, and the exhaust fluids transferred from the cooker to an exhaust line merely contact the opposite side of the diaphragm, whereby the valve element itself separates the exhaust fluids from the valve operating fluids.

Although this inventive valve is contemplated for use in a pressure cooker system in which the food to be prepared is placed in a pressurized vessel, the drain valve used in this system also has certain novel features embodied therein which have other applications. In order to exhaust air from the vessel at the beginning of a cooking operation, the drain valve must remain in its open position during the initial portion of the cooking operation. Moreover, during this relatively short initial interval of time, which is usually about two minutes, the rapid condensation of the steam on the cold food causes the pressure within the closed vessel to decrease rapidly, and for the purpose of preventing the decreased or negative pressure from tending to draw the diaphragm into a closed position, the drain valve is provided with a washer-like biasing spring to maintain the diaphragm in an open position. The biasing spring has the further function of preventing that portion of the flexible diaphragm which extends beyond the annular seat from deforming when the diaphragm is forced into a closed position in response to clean steam under pressure.

Other objects and advantages and a better understanding of the invention will appear from the following detailed description taken in connection with the appended sheet of drawings wherein:

FIGURE 1 is a schematic view of a steam pressure cooker embodying the principles of the present invention;

FIGURE 2 is a cross-sectional view of a drain valve of FIG. 1;

FIGURE 3 is a bottom view of the upper portion of the drain valve of FIG. 2 taken substantially along the line 3—3 thereof;

FIGURE 4 is a plan view of the bottom portion of the drain valve of FIG. 2 taken substantially along the line 4—4 thereof; and FIGURE 5 is the same view of the drain valve as shown in FIG. 2, but illustrates the diaphragm in its closed position.

Referring now to FIG. 1, a diaphragm-operated drain valve constructed in accordance with the present invention is contemplated for use in a steam pressure cooker system, wherein a quantity of food A to be cooked is placed within an open-topped pan 10 and positioned within a closed chamber or cooking compartment or pressure vessel 11.

The pressure vessel may take any desired form but in the embodiment shown it is generally in the shape of a hollow cylinder having cylindrical side walls 12 closed at one end by an integral end 13 and at the opposite end by a door 14 cooperating with an inwardly extending flange 15 on the side walls 12. The door 14 is resilient and in the unstressed state is elliptically shaped and bowed about its horizontal axis such that its vertical diameter is less than the inner diameter of the flange 15 so that the door 14, by a sideward motion, may be moved inwardly through the opening 17. This general type of door construction is described in detail in United States Patents 2,828,045 and 2,904,212 to Vischer.

The door 14, when closed as shown in FIG. 1, is flexed to a flat circular condition so that its outer edges bear against the inner surfaces of the flange 15. Before the chamber is pressurized this is done by means of a lever arrangement comprised of a wheel 18 rotatably mounted on a short axial rod 19. Rotation of the wheel 18 moves the door from the flexed unstressed position to a sealing position with the door in pressure sealing engagement with the inner edges of the flange 15. The construction is such that once pressure has been built up on the inside of the vessel 11, the door 14 will remain in sealing engagement with the flange 15 even if the lever arrangement is released.

For the purpose of heating the food A in the pan 10, a supply means or steam ejector pipe 20 extends generally the entire length of the pressure vessel 11 along its vertical midplane high enough so as to provide clearance for insertion and removal of the pan 10. The steam ejector pipe 20 is provided on the lower side with a plurality of steam-ejecting orifices 22 so formed as to direct jets of steam directly into the entire mass of the food A in the pan 10.

In order to supply clean, dry steam from a suitable source of steam under pressure to the steam ejector pipe 20, there is provided a vapor pipe 23 which supplies the steam from the source of steam under pressure to a conventional normally-closed solenoid valve 24 which is connected to the pipe 20 and which has an operating coil shown schematically at 24'. For the purpose of controlling the discharge of drainage fluids, such as air, gas, food particles in suspension or water from the vessel 11 to an exhaust line 25, a drainage system is provided consisting of a pipe 26 communicating with the interior of the pressure vessel 11 preferably at the lowest point thereof and a diaphragm-operated drain valve 27 for controlling the flow of air, gas, suspended food particles or water from the pipe 26 to the exhaust line 25.

In this embodiment and as described in detail hereinafter, apparatus is provided for automatically opening and closing the valves 24 and 27 in the proper sequence and leaving them open or closed for the proper time period so that the cooking operation may progress on a substantially automatic basis.

In order to enable steam under pressure to actuate the diaphragm drain valve 27, a conventional three-way solenoid valve 28 is connected between a line 27' to the valve 27, the source of clean steam and a vent pipe 29. An operating coil 28' (shown schematically) when energized, causes the three-way valve 28 to switch into a first position to disconnect the steam source from the line 27' and to connect the line 27' to the vent pipe 29. The pressure in the cooking chamber thus opens the valve 27 to enable the fluids to drain from the vessel 11 into the exhaust line 25. Upon de-energization of the coil 28', the valve 28 is moved into the second position to connect the line 27' to the steam source, thereby to close the drain valve 27 whereby withdrawal of the drainage fluids is cut off from the pressure vessel 11. In its second position, the three-way valve 28 enables steam under pressure to enter the valve 27 via the connecting pipe 27'.

The solenoids 24' and 28' are each energized from the power line L2 under the control of the single pole, double throw switches 31 and 32 respectively. The switch 31 is a pressure-responsive switch and has a pressure-actuated bellows 33 communicating with the interior of the pressure vessel 11 through a conduit 34. In order to actuate the other switch 32, a timer of conventional construction is provided, which timer includes a motor 35 that rotates a cam 36 operatively associated with a cam follower 37. The cam 36 is shown in the OFF position with the follower 37 resting in a notch 38 formed in the cam surface. A dial knob 39, in association with a graduated scale 40, enables manual setting of the cooking period. Rotation of the dial knob 39 rotates the cam 36 and enables the timer to be set for the desired period of operation.

When an operator desires to start a cooking operation, a quantity of food A, usually but not necessarily loose and frozen, is placed in the pan 10. This pan is then placed in the pressure vessel 11 and the door 14 closed and brought into sealing engagement with the flange 15 by operation of the wheel 18. The operator then sets the dial 39 to the desired time period on the scale 40. This time period may be as desired, but is normally predetermined for each type of food to be placed in the container 10. Actuation of the dial 39 rotates the cam 36 and closes the normally-open contact 45 of the switch 32. The switch 41 may then be closed by the operator. This opens the normally-closed contact 46 without effect because of the normally-closed contacts 42 which are in parallel therewith. The closed contacts 45 cause energization of the coil 24' from wire 48 to the line L2, thus opening valve 24. Steam immediately flows through the steam ejector pipe 30 and the steam-ejecting orifices 32 onto the food A in the pressure vessel 11. The jets of steam strike the cold food A, whereby the steam gives up its latent heat of fusion to the food and is rapidly condensed. The rapid condensation of the steam on the food causes the pressure within the vessel 11 to decrease rapidly.

When steam flows into the cooking chamber, the temperature of the food is raised rapidly toward the temperature of the steam and air is forced out of the chamber. As the top layer of the food becomes heated, the jets of steam are no longer condensed by such top layer and penetrate into intermediate layers of the food where the steam is condensed with the same result. As these intermediate layers are heated to the elevated temperatures, the steam continues to project into the spaces between the particles of food to the lowermost levels and these lowermost levels are raised to the elevated temperatures. It is to be noted that in this operation the steam jets tend to drive out the air in the spaces between the food. Such air, along with the remainder of the air in the pressure vessel, is then carried outwardly through the discharge pipe 26 and through the valve 27 which is open at this time. Even though the decreased or negative pressure from within the vessel is coupled to the valve 27, the diaphragm in the valve 27 is maintained in an open position in accordance with principles of the present invention as hereinafter described.

Steam continues to flow into the chamber 11 under full pressure, usually 15 p.s.i.g., and as the temperature of the food increases, less steam condenses causing the pressure in the chamber 11 to rise. Usually the pressure within the vessel 11 begins to increase about two minutes after the initiation of the cooking operation. In this respect, it is to be noted that the size of the discharge pipe 26, the opening in the valve 27, or both, form an orifice having an area in relation to the rate of steam supply such that the pressure within the vessel 11 will not appreciably increase until the rapid rate of steam condensation brought on by the presence of the frozen food particles practically ceases. Once the food is thawed, the rate of condensation decreases and the pressure then rises. When this pressure reaches a predetermined value, normally about two p.s.i., the bellows 33 is expanded a sufficient amount to open contacts 42 and close contacts 50 of the switch 31. Opening of the contacts 42 de-energizes the coil 28' and valve 28 switches to its ON position to supply steam under pressure to valve 27, thereby closing valve 27 while valve 24 remains open. The pressure within the vessel 11 thus rises to the full steam line pressure which in the preferred embodiment is 15 p.s.i.g. The food A then continues to cook.

In addition to operating the vlaves 28 and 27, closing of the normally open contacts 50 when the food in the cooker has been substantially defrosted energizes the motor 35 of the timer, which motor then rotates the cam 36 for the period of time set by the dial knob 39.

As soon as the notch 38 rotates to a position which is opposite to the cam follower 37, the switch 32 opens its contact 45 to de-energize coil 24', thereby closing the valve 24 to stop the flow of steam into the vessel 11. Also, contacts 46 close to energize solenoid 28' which actuates the valve 28 to its OFF position to open valve 27 so that the pressure on the inside of the vessel 11 is reduced to atmospheric pressure.

Referring now to FIG. 2, the diaphragm-operated drain valve 27 is shown in detail and includes a valve body 51 having an inlet 52 for threadably receiving the pipe 26 to provide communication with the vessel 11. An outlet 53 is provided for threadably receiving the exhaust pipe 25. For the purpose of passing fluids between the inlet 52 and the outlet 53, a passageway 52A enables the inlet 52 to communicate with the center of a chamber 54 formed within the upper portion of the valve body 51. The outlet 53 directly communicates with one side of the chamber 54. As shown in FIG. 4, the chamber 54 is generally annular and symmetrically disposed at the center of the lower valve body 51.

In order to control the movement of the discharge fluids from the inlet 52 to the outlet 53, a thin flexible diaphragm 56 which may be formed of rubber or the like is supported above the chamber 54 so that the lower surface of the diaphragm 56 forms the upper wall of the chamber 54. Due to the flexible composition of the diaphragm, the diaphragm 56 can move downwardly into a closed position in sealing engagement with an annular seat portion 52B of the inlet passageway 52A, whereby communication between the inlet 52 and the outlet 53 is prevented. As shown in FIG. 4, the seat portion 52B is circular in cross-section and disposed at the center of the valve body 51.

For the purpose of moving the diaphragm 56 in a downward direction, an upper valve body 58 is fixedly connected above the diaphragm 56 and includes an inlet 59 located in the top portion thereof for threadably receiving the connecting pipe 27' for communication with the valve 28. The diaphragm 56 is connected in sealing engagement between the lower valve body 51 and the upper control valve body 58 by means of a set of four machine screws 60, which extend through aligned holes in the diaphragm 56 into threaded holes in the body 51, as shown in FIGS. 3 and 4.

In order to receive and uniformly distribute clean steam under pressure onto a relatively large portion of the top surface area of the diaphragm 56, the valve body 58 includes a recess which cooperates with the diaphragm 56 to define a closed control chamber 61. For the purpose of preventing marking and damage to the flexible rubber diaphragm 56 as a result of its being drawn into the inlet 59 when the positive pressure is present within the vessel, a rigid metal cross 62 is fixedly mounted at the opening to the inlet 59 adjacent to the top surface of the diaphragm 56, as best illustrated in FIG. 3.

Clean steam under pressure enters the closed chamber 61 via the inlet 59 to apply pressure on the upper surface of the flexible diaphragm 56 whereby the diaphragm 56 is urged in a downward direction into sealing engagement with the seat portion 52B of the inlet passageway 52A. When the clean steam under pressure is no longer applied to the diaphragm, the diaphragm 56 tends to restore to its normal shape and position so that the inlet 52 can communicate with the outlet 53.

For the purpose of helping urge the diaphragm in its upward movement away from the seat portion 52B, a biasing spring 63 overlies the under surface of the diaphragm. The biasing spring 63 may be a thin plate, composed of a spring metal, having a centrally-located opening larger than the annular seat portion 52B to enable the central portion of the diaphragm 56 to move into sealing engagement with the seat portion 52B. For mounting purposes, the machine screws 60 extend through four holes near the four corners of the spring 63. In order to prevent the diaphragm 56 from being drawn into a closed position when a negative pressure is present within the vessel, which occurs during the initial two-minute interval of the cooking cycle, the biasing spring 63, when unstressed, holds the diaphragm 56 away from the seat portion 52B.

As best illustrated in FIG. 5, the biasing spring 63 also functions to prevent the diaphragm 56 from deforming when it is forced into its closed position. The biasing spring 63 provides support for that portion of the underside of the diaphragm 56 which extends beyond the seat portion 52B. Without the biasing spring 63, the portion of the diaphragm 56 which extends beyond the seat portion 52B would tend to deform in a downward direction around the valve seat 52B in response to the clean steam under pressure acting on the top surface of the diaphragm over a relatively large area as compared with the area of the seat 52B.

For the purpose of limiting distortion of the diaphragm 56 during drainage of the cooking chamber, the upper wall of the upper chamber 61 of the valve body 58 is concave in shape. Because the diaphragm 56 is forced upwardly against the concave upper wall of the chamber 61 by the pressure from within the vessel via the inlet 52, the sloping sides of the upper wall of the chamber 61 have a gradual slope to prevent damage to the diaphragm 56.

The separation of the upper chamber 61 from the lower chamber 54 by means of the imperforate diaphragm 56 prevents the corrosive discharge fluids that enter the lower chamber 54 from entering the clean steam areas of the upper valve body 58.

Although various minor modifications of the present invention will become readily apparent to those versed in the art, it should be understood that I wish to embody within the scope of the patent warranted hereon, all such embodiments as reasonably and properly come within the scope of my contribution to the art.

I claim:
1. A pressure cooker comprising:
   a sealable vessel having a cooking compartment therein for holding products to be prepared;
   supply means for supplying clean, heated vapor under pressure to said compartment;
   a vapor pipe connected to said supply means for supplying said clean, heated vapor under pressure to said supply means;
   a drain valve connected to said compartment for draining fluids from said vessel; and
   control means connected to said vapor pipe for closing said valve to seal said compartment from the atmosphere and alternatively for opening said valve to drain fluids from said compartment, said valve including means responsive to the supply of pressurized vapor thereto for closing said valve during the supply of said vapor to said compartment.

2. The pressure cooker according to claim 1, wherein said control means comprises a solenoid-operated valve.

3. The pressure cooker according to claim 1, wherein said drain valve further includes a valve body having a cavity therein:
   an inlet and an outlet each mounted on said valve body for communicating with said cavity;
   a valve seat surrounding said inlet;
   a diaphragm mounted on said valve body within said cavity to cooperate with said cavity to form first and second chambers; and
   a second inlet connected to said control means for communicating said clean, heated vapor under pressure with said first chamber so that said diaphragm moves into a closed position in sealing engagement with said valve seat in response to the pressure of said clean, heated vapor within said first chamber acting on said diaphragm.

4. The pressure cooker according to claim 3, wherein said drain valve still further includes spring biasing means mounted on said valve body for biasing said diaphragm into an open position.

5. The pressure cooker according to claim 4, wherein said spring biasing means comprises a spring metal plate having an aperture therein aligned with said valve seat, said aperture being slightly larger than the face of said valve seat.

6. The pressure cooker according to claim 5, wherein the opening through said valve seat is substantially smaller than the surface area of said diaphragm acted-upon by the clean-heated vapor under pressure from within said first chamber.

7. The pressure cooker according to claim 6, wherein said valve seat is an upright tubular boss disposed approximately at the center of said second chamber, said metal plate overlying said diaphragm on the side of said diaphragm that faces said tubular valve seat and positioned in relatively close proximity with said diaphragm so that as vapor under pressure is applied to said diaphragm, said diaphragm can move into sealing engagement with said valve seat and the plate can flex toward said seat with the aperture in said plate passing over said seat.

8. The pressure cooker according to claim 7, wherein said control means comprises a solenoid-operated valve.

References Cited
UNITED STATES PATENTS

| | | | |
|---|---|---|---|
| 300,554 | 6/1884 | Baker | 126—348 |
| 2,452,790 | 11/1948 | Pledger. | |
| 2,713,702 | 7/1955 | Jewell. | |
| 3,071,063 | 1/1963 | Churley | 99—332 |

FREDERICK L. MATTESON, Jr., *Primary Examiner.*

ROBERT A. DUA, *Assistant Examiner.*

U.S. Cl. X.R.

99—332